United States Patent
Miyazaki et al.

[11] Patent Number: 6,089,276
[45] Date of Patent: Jul. 18, 2000

[54] METHOD FOR REPAIRING BURIED PIPE USING A METAL PIPE AND METHOD FOR MANUFACTURING METAL PIPES THAT ARE USED IN THE REPAIRING METHOD

[75] Inventors: Yasuo Miyazaki, Osaka; Akira Kamide, Higashiosaka, both of Japan

[73] Assignee: Osaka Bosui Construction Co., Ltd., Osaka, Japan

[21] Appl. No.: 09/142,428
[22] PCT Filed: Feb. 21, 1997
[86] PCT No.: PCT/JP97/00476
   § 371 Date: Aug. 31, 1998
   § 102(e) Date: Aug. 31, 1998
[87] PCT Pub. No.: WO97/32152
   PCT Pub. Date: Sep. 4, 1997

[30] Foreign Application Priority Data
   Mar. 1, 1996 [JP] Japan .......... 8-44618
   Oct. 19, 1996 [JP] Japan .......... 8-266911

[51] Int. Cl.[7] .................................. F16L 55/16
[52] U.S. Cl. ................. 138/98; 138/97; 264/269
[58] Field of Search ............... 138/98, 97; 264/269, 264/516; 156/287, 294; 405/150.1

[56] References Cited

U.S. PATENT DOCUMENTS

| | | | |
|---|---|---|---|
| 4,385,885 | 5/1983 | Wood | 138/98 X |
| 4,867,921 | 9/1989 | Steketee, Jr. | |
| 5,101,863 | 4/1992 | Fujii et al. | 138/98 |
| 5,265,648 | 11/1993 | Lyon | 138/98 |
| 5,487,411 | 1/1996 | Goncalves | 138/98 |
| 5,810,053 | 9/1998 | Mandich | 138/98 |
| 5,816,293 | 10/1998 | Kiest, Jr. | 138/98 |

FOREIGN PATENT DOCUMENTS

| | | |
|---|---|---|
| 62-266287 | 11/1987 | Japan . |
| 4-59141 | 2/1992 | Japan . |

*Primary Examiner*—Patrick Brinson
*Attorney, Agent, or Firm*—Armstrong, Westerman, Hattori, McLeland & Naughton

[57] ABSTRACT

In renovating an existing underground pipe with a new metal pipe installed inside the underground pipe, the invention provides a method of repairing the existing underground pipe characterized by transporting a metal tubular material as wound up in the form of a roll to a repair site, the tubular material being deformed to a flat folded form so as to be diminished in effective outside diameter and to be restorable to a metal pipe of an outside diameter corresponding to the inside diameter of the underground pipe when inflated by application of pressure from inside, installing the roll of tubular material on the ground, subsequently inserting the tubular material into the underground pipe through an underground work pit while unwinding the tubular material from the roll, closing opposite ends of the inserted portion of the tubular material, and thereafter restoring the closed portion of the tubular material to a metal pipe of circular cross section by applying pressure thereto from inside with a pressure fluid. Thus, the metal pipe can be installed inside the existing underground pipe efficiently without necessitating a large work space inside the work pit.

7 Claims, 19 Drawing Sheets

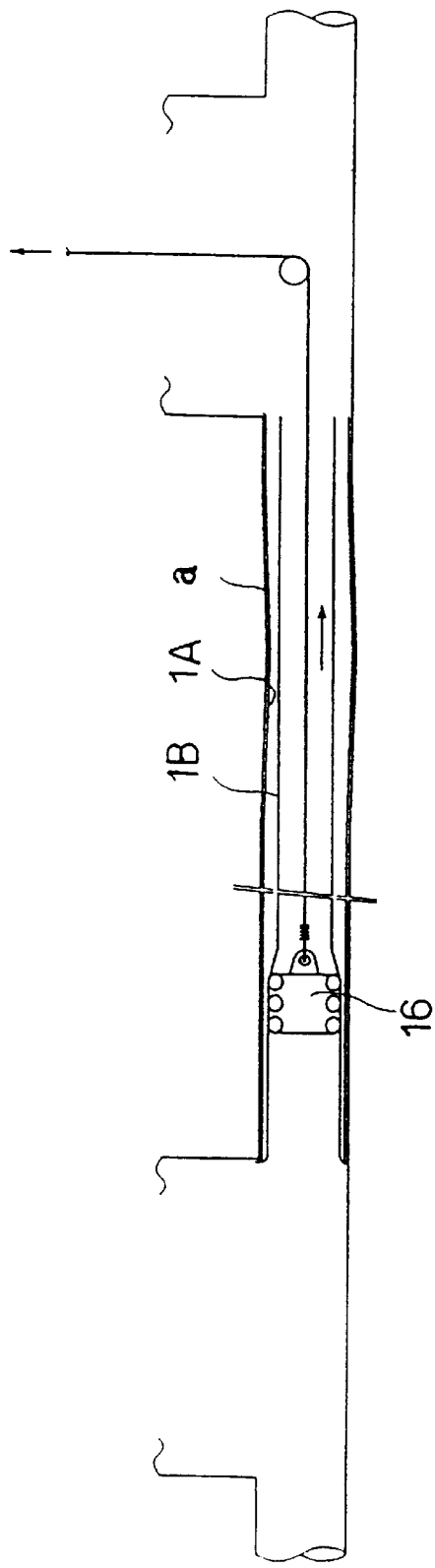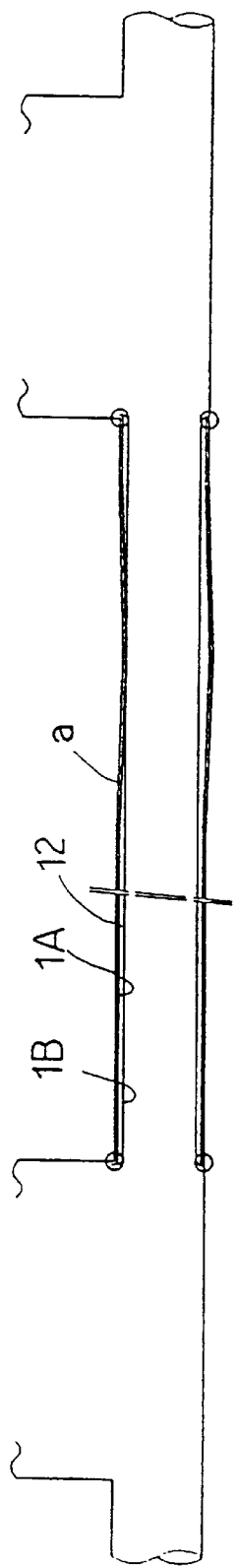

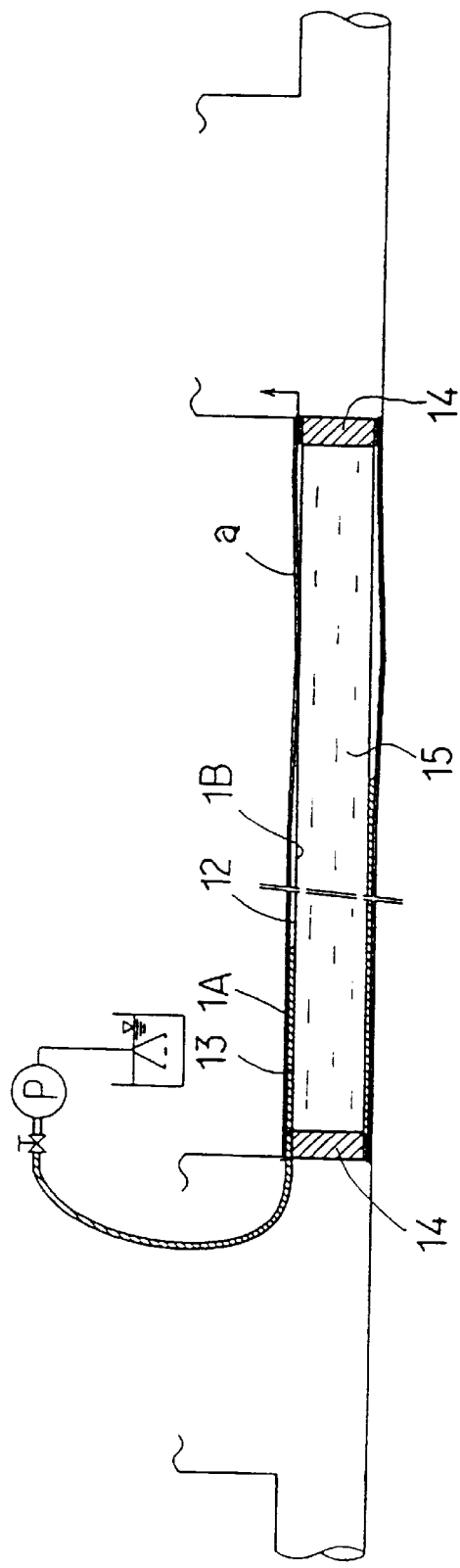
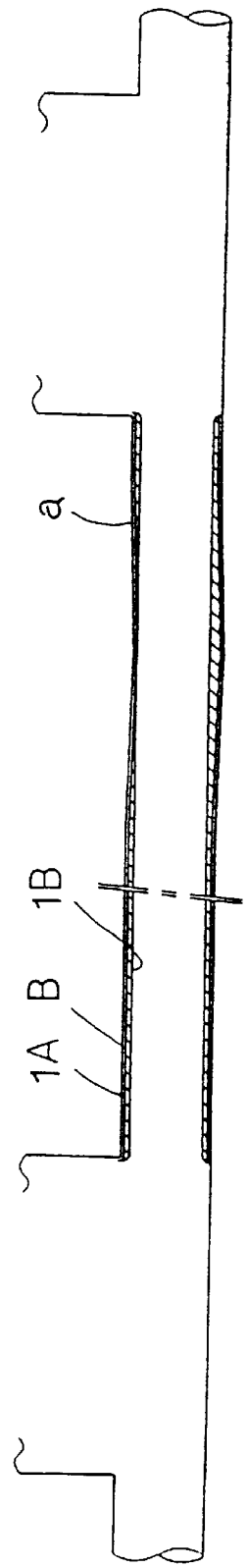

FIG. 13
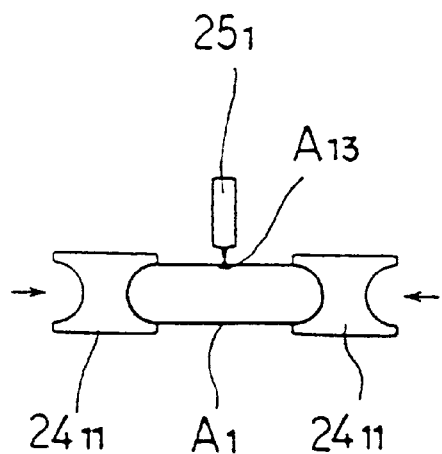
FIG. 14
(a) 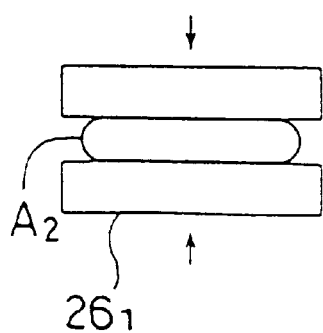   (b) 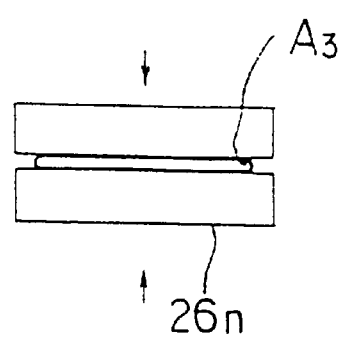

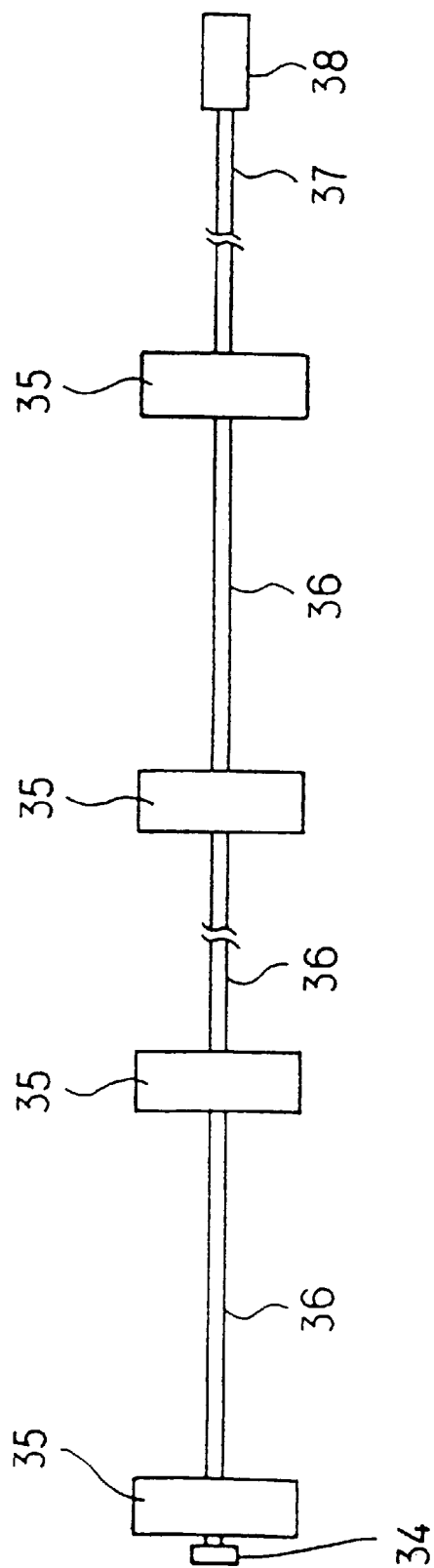

METHOD FOR REPAIRING BURIED PIPE USING A METAL PIPE AND METHOD FOR MANUFACTURING METAL PIPES THAT ARE USED IN THE REPAIRING METHOD

TECHNICAL FIELD

The present invention relates to a method of repairing existing underground pipes with a metal tubular material, and a process for producing the metal tubular material for use in the repairing method, more particularly to a repairing method of renovating existing underground pipes, such as sewage pipes, town gas pipes and water supply pipes, by installing a new metal pipe inside the underground pipe with use of a metal tubular material in a flattend and folded shape by plastic deformation, and to a process for producing the metal tubular material in a flattend and folded shape for use in the repairing method.

BACKGROUND ART

The methods of repairing existing underground pipes heretofore proposed are divided generally into those wherein a metal tubular material is used, and those using a plastic tubular material. From the viewpoint of the reliability of repairs, the methods of the former type are more excellent wherein the metal tubular material is used.

The methods of repairing existing underground pipes with the metal tubular material already proposed include the so-called pipe-in-pipe method wherein metal tubular members having a specified length and a circular cross section are inserted into the existing underground pipe while joining the tubular members to one another by welding within a work pit formed by excavation at an intermediate portion of the underground pipe to install a new metal pipe inside the underground pipe.

However, the pipe-in-pipe method is not desirable because this method requires much labor and time for welding the metal tubular members to one another, is low in work efficiency and necessitates a wide work space, i.e., a work pit of increased size, for successively joining the tubular members by welding. Further if it is attempted to use this method for repairing sewage pipes, manholes are too small and unsuitable for use as work pits.

DISCLOSURE OF THE INVENTION

An object of the present invention is to provide a repairing method adapted to install a new pipe inside an existing underground pipe with a high efficiency with use of a metal tubular material, more particularly a metal tubular material in a flattend and folded shape so as to be wound up into a roll.

Another object of the invention is to provide a repairing method which can be satisfactorily practiced in a work pit comparable to the manhole of the sewage pipe in the size of work space available and which is useful especially for repairing sewage pipes.

Still another object of the invention is to provide a process suitable for producing small quantities of a wide variety of metal tubular materials in a flattend and folded shape.

Other features of the invention will become apparent from the following description.

In renovating an existing underground pipe with a new metal pipe installed inside the underground pipe, the present invention provides a method of repairing the existing underground pipe characterized by transporting a metal tubular material as wound up in the form of a roll to a repair site, the tubular material being folded flat by plastic deformation so as to be diminished in effective outside diameter and to be restorable to a metal pipe of an outside diameter corresponding to the inside diameter of the underground pipe when inflated by application of pressure from inside, installing the roll of tubular material on the ground, subsequently inserting the tubular material into the underground pipe through an underground work pit while unwinding the tubular material from the roll, closing opposite ends of the inserted portion of the tubular material, and thereafter restoring the closed portion of the tubular material to a metal pipe of circular cross section by applying pressure thereto from inside with a pressure fluids The present invention further provides a process for continuously producing a metal tubular material in a flattend and folded shape for use in a repairing method according to claim 1, the process being characterized by continuously subjecting a metal strip to a first step to a fifth step in succession while unwinding the metal strip from a coil, the first step comprising passing the metal strip continuously unwound from the coil through a plurality of forming roll units arranged side by side to progressively form the metal strip into a metal tubular product of elliptical cross section, the metal tubular product comprising in cross section opposed short sides each in the form of a rounded portion subtending an angle of about 180 deg and opposed long sides in the form of two parallel straight portions, the metal tubular product having a seam at the midpoint of one of the straight portions or in the vicinity thereof, the second step comprising welding the seam of the metal tubular product continuously sent out from the first step to prepare a metal tube of elliptical cross section, the third step comprising passing the metal tube continuously sent out from the second step through a plurality of flattening roll units arranged side by side to progressively flatten the metal tube, the fourth step comprising passing the resulting flat metal tube continuously sent out from the third step through a plurality of folding roll units arranged side by side to progressively fold the flat metal tube to obtain a metal tubular material in a flattend and folded shape, the fifth step comprising winding up the tubular material in a flattend and folded shape and continuously sent out from the fourth step into a roll.

BRIEF DESCRIPTION OF THE DRAWINGS

FIG. 7 is a view in longitudinal section schematically showing how to enlarge the inner new pipe;

FIG. 8 is a view in longitudinal section schematically showing the inner and outer new pipes as installed;

FIG. 9 is a view in longitudinal section schematically showing how to form a lining in a circumferential clearance between the inner and outer new pipes;

FIG. 10 is a view in longitudinal section schematically showing the new pipes with the lining formed completely;

FIG. 13 is a diagram schematically showing a second step, i.e., a welding operation;

FIG. 14 is a diagram schematically showing a third step, i.e., a flattening operation;

FIG. 22 is a diagram schematically showing inner roll supports as connected together by rods.

BEST MODE OF CARRYING OUT THE INVENTION

Embodiments of the invention will be described below with reference to the accompanying drawings.

Figure 1:
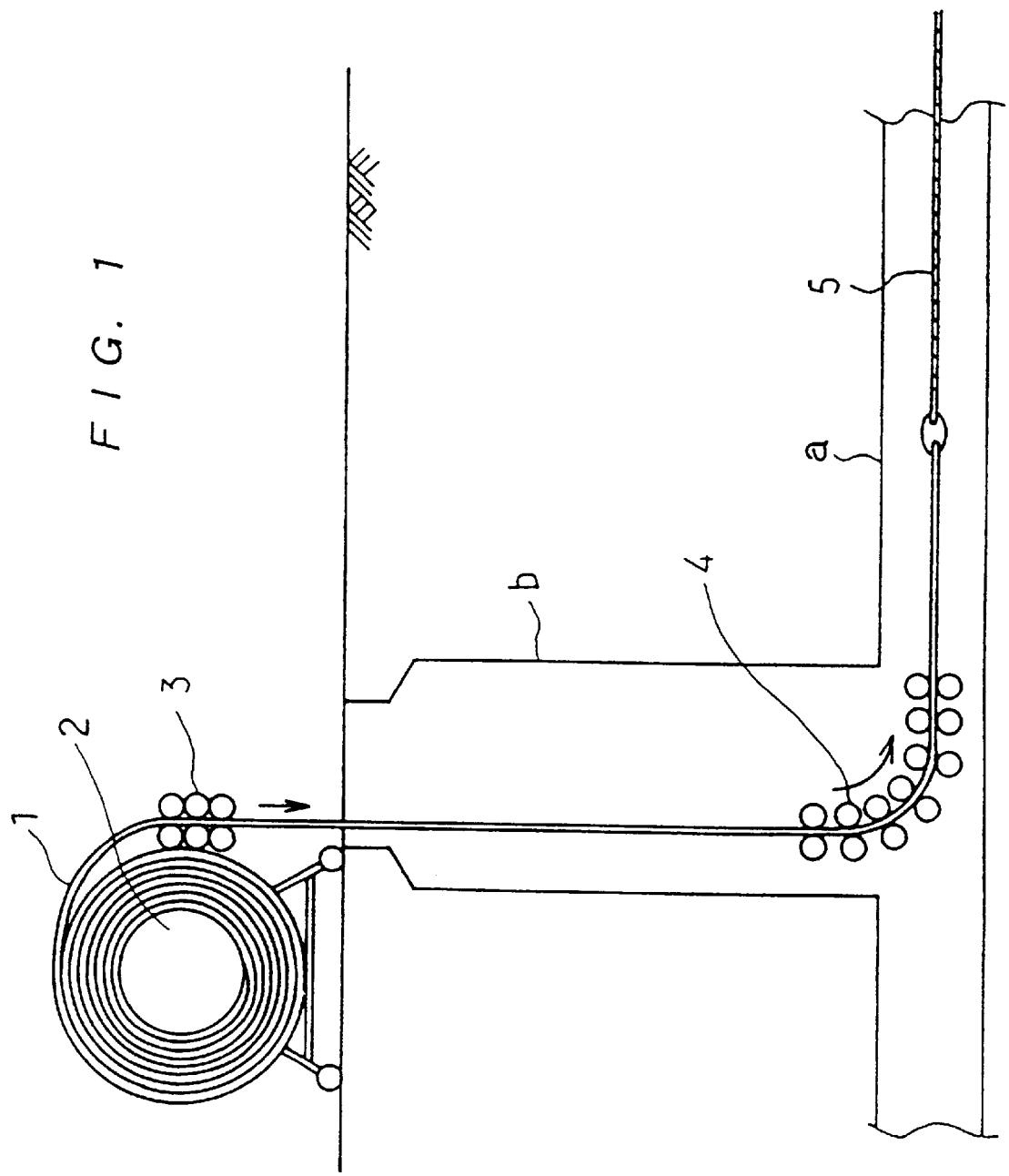
FIG. 1 is a diagram schematically showing how to insert a metal tubular material, in a flattend and folded shape, into an existing underground pipe according to the repair method of the invention.

FIG. 1 shows a case wherein the method of the present invention is used for repairing an existing underground pipe, for example, a sewage pipe a.

Figure 2:
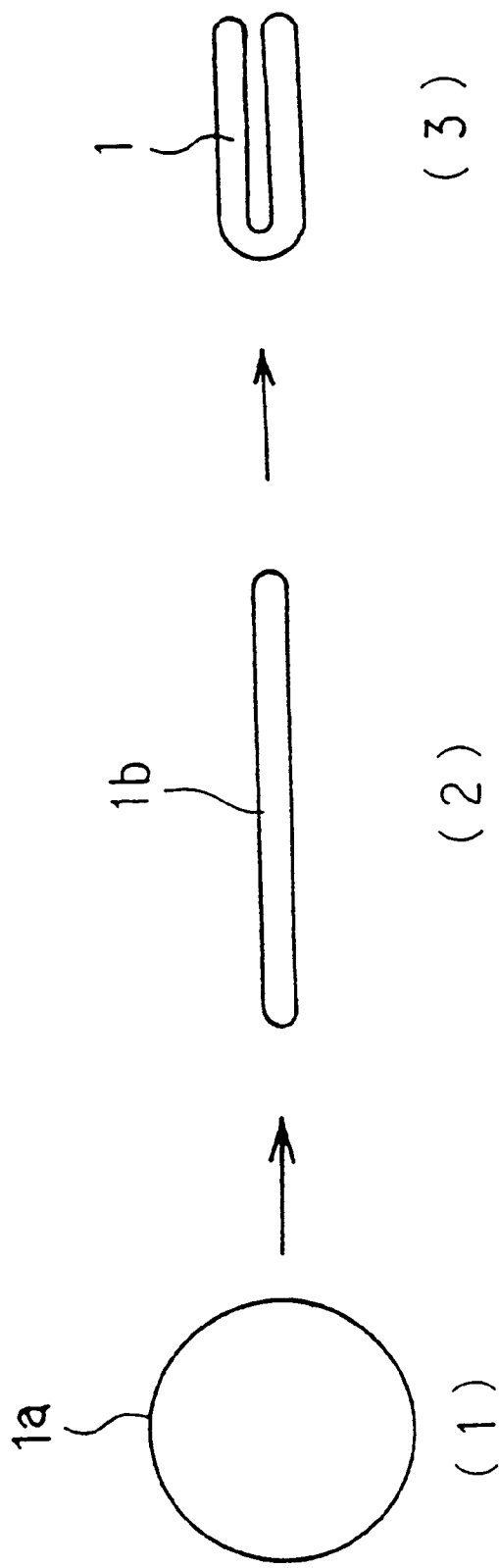
FIG. 2 is a diagram schematically showing stepwise how to fold the metal tubular material flat.

The material to be used for repairing the sewage pipe a is a metal tubular material 1 having an outside circumference approximately equal to the inside circumference of the sewage pipe a. As shown in FIG. 2, the metal tubular material 1 is in a flat folded form as prepared by plastic deformation, i.e., by collapsing an original tube 1a into a flat tube 1b and further folding the flat tube in two so as to be wound into a roll and inserted into the sewage pipe 1.

The metal tubular material 1 may be made, for example, of steel, stainless steel or aluminum, and such basic substance is not limited particularly insofar as it is plastically deformable. Stainless steel is especially suitable because this steel is excellent in workability and high in corrosion resistance that is required of repair materials.

The metal tubular material 1 has a relative small wall thickness in view of plastic deformation work. Based on the outside diameter which is, for example, 100 to 800 mm calculated as a true circle, the thickness is suitably determined from the range of about $1/100$ to about $1/500$ of the diameter, with consideration given to the base substance.

The metal tubular material 1 is in the form of a belt, flexible and can be wound up into a roll. Being folded in two from a flat form, the tubular material is reduced in effective cross sectional area and can be inserted into the sewage pipe a.

As shown in FIG. 1, the metal tubular material 1 is transported to the site of repair work, as wound up around a roll 2 in a flat folded form, and fixedly placed on the ground near a manhole b. At this fixed position, the tubular material is passed through the manhole b and inserted into the sewage pipe a while being paid off or unwound from the roll 2.

When unwound from the roll 2, the metal tubular material 1 is immediately passed through a correcting roll device 3, has its curl removed during the passage through the device 3, and is moved downward in a nearly straight state through the manhole b and inserted into the sewage pipe a while changing from vertical to horizontal in direction during passage through a guide roll device 4 at the lower end of the manhole b.

As the means for inserting the metal tubular material 1 into the sewage pipe a while unwinding the material from the roll 2, FIG. 1 shows a pulling rope 5. The rope 5 is hauled, for example, by the operation of a winch (not shown) near the position of an adjacent manhole b' (see FIG. 3), whereby the tubular material 1 can be inserted into the sewage pipe a while being paid off in a flattend and folded shape from the roll 2.

Figure 3:
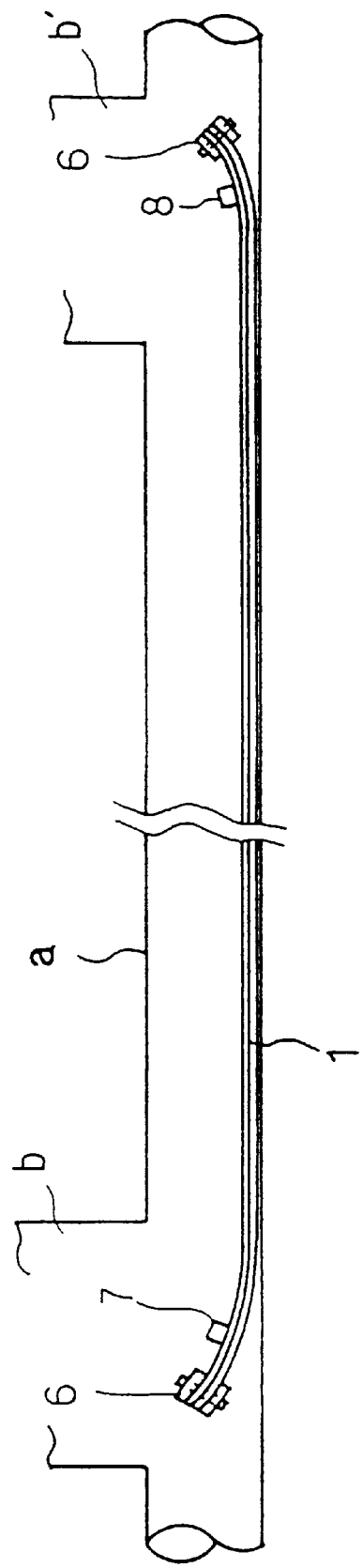
FIG. 3 is a diagram schematically showing the folded metal tubular material as inserted in the existing underground pipe and as treated at its opposite ends.

After the metal tubular material 1 has been inserted into the sewage pipe a over the entire distance between the manholes b, b', the inserted portion of the tubular material 1 is cut off from the other portion thereof on the roll side, opposite open ends are held closed, for example, with respective clamps 6, and an inlet portion 7 and an outlet portion 8 for pressure fluid, such as pressure water, are attached to the tubular material In the vicinity of the clamps 6, 6 by welding means as seen in FIG. 3.

Figure 4:
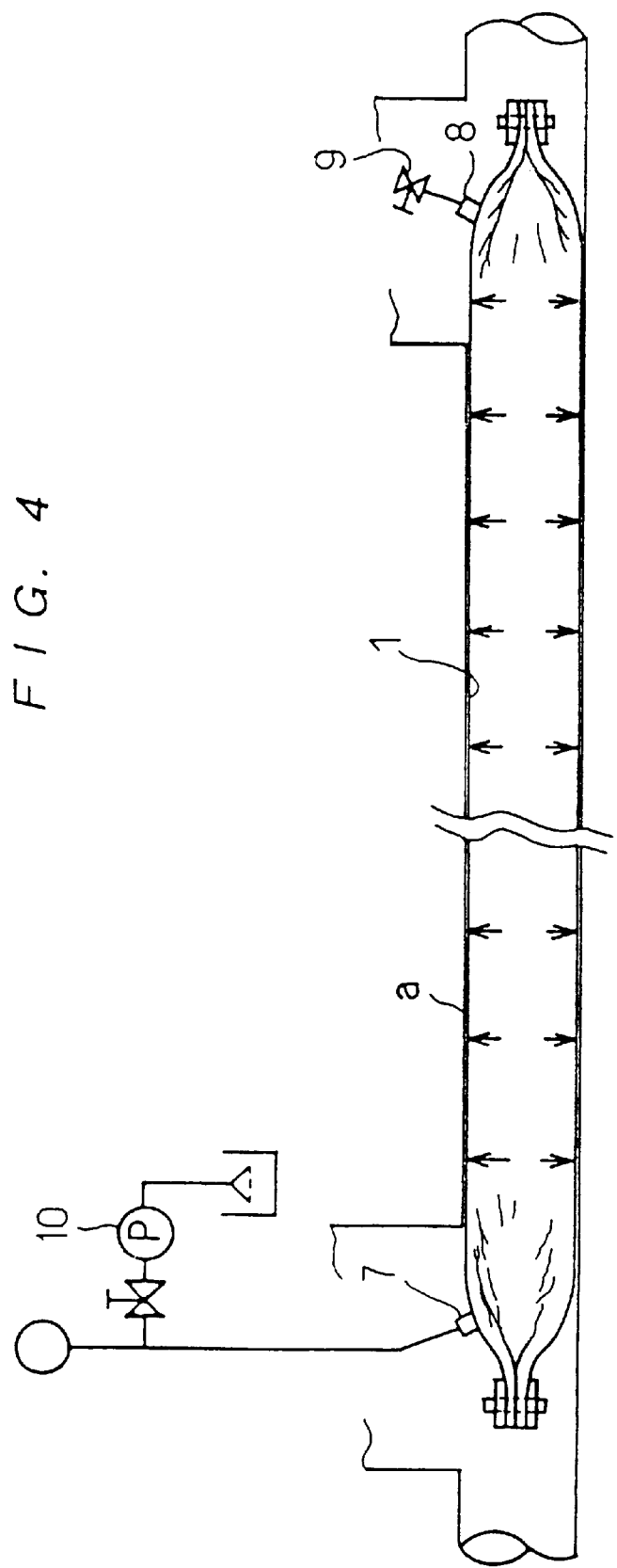
FIG. 4 is a diagram schematically showing how to restore the metal tubular material in shape.

Next as shown in FIG. 4, water is supplied to and filled into the metal tubular material 1 from the inlet portion 7 by operating a pump 10, with a valve 9 for the outlet portion 8 opened, then the valve 9 is closed, and an increased pressure is thereafter given to the water by the operation of the pump 10.

When the water pressure within the metal tubular material 1 reaches a level sufficient to plastically deform the tubular material 1, the material 1 is gradually restored from the flat folded state [see FIG. 2, (3)] to the original tube 1a [see FIG. 2, (1)] through a flat shape [see FIG. 2, (2)], thus eventually returning to the state of the original tube 1a.

Figure 5:
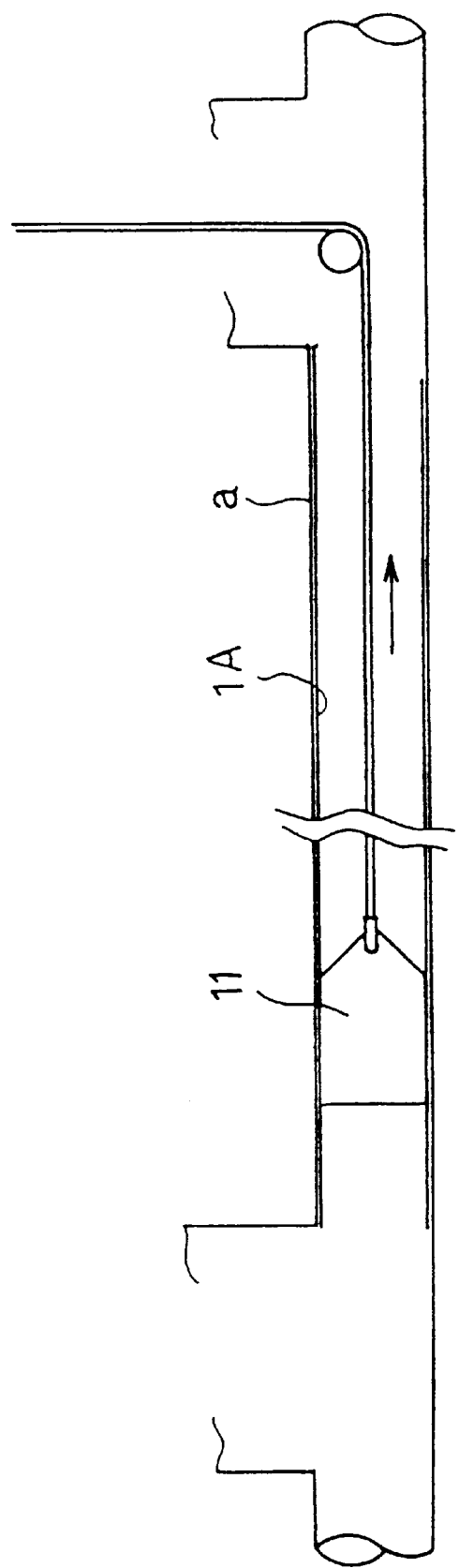
FIG. 5 is a diagram schematically showing how to correct a new pipe in shape, as installed inside the underground pipe.

After the metal tubular material 1 has been restored to the state of the original tube 1a in shape, the tubular material is relieved of the pressure and has its excessive opposite end portions cut off, whereby a new metal pipe 1A can be installed inside the sewage pipe a as shown in FIG. 5.

The new pipe 1A is likely to have a slight plastic deformation remaining in the form of a crease at the folded portion although dependent on the state to which the metal tubular material 1 has been flattened. To remove the crease and correct the new pipe 1A in shape, an enlarging device 11 is forcibly passed through the new pipe 1A to enlarge the new pipe 1A generally in pressing contact with the sewage pipe a, whereby the new pipe 1A is completely installed in place.

When the existing underground pipe is subjected to pressure from inside as is the case with the town gas pipe or water supply pipe, the new metal pipe 1A is, for example, a stainless steel pipe which exhibits high strength against internal pressure although having a small wall thickness and therefore encounters no particular problem.

However, when the pressure from outside needs to be considered as is the case with the sewage pipe a, the new metal pipe 1A, which is relatively small in wall thickness, is unable to fully withstand the external pressure and therefore requires some reinforcing means against the external pressure.

Figure 6:
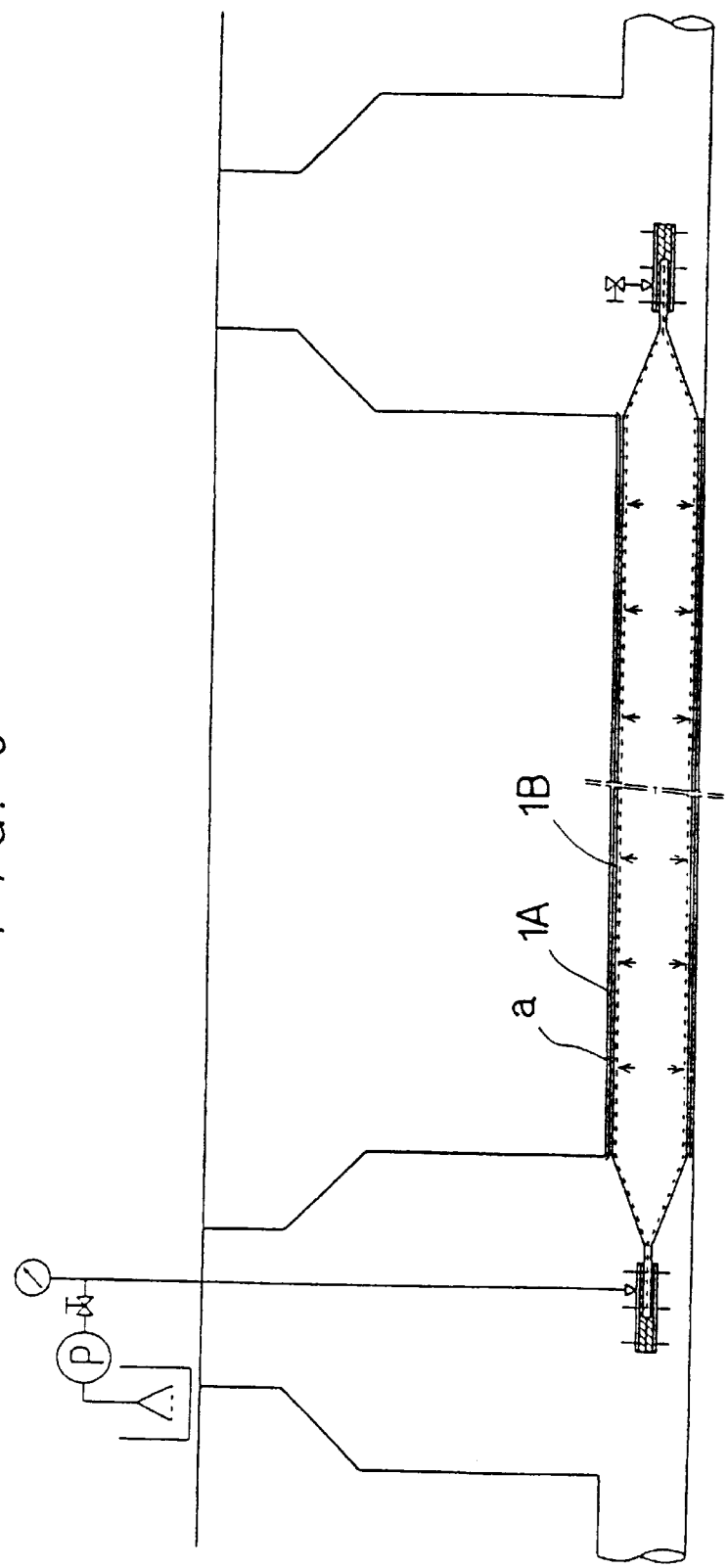
FIG. 6 is a view in longitudinal section schematically showing another new pipe while it is being installed inside the new pipe.

FIGS. 6 to 9 show an example of such reinforcing means against the external pressure. With reference to FIG. 6, this reinforcing means comprises another new pipe 1B slightly smaller than the new pipe 1A in outside diameter and provided inside the new pipe 1A by the repair method previously described. The new pipe 1B placed in is thereafter corrected in shape by using an enlarging device 16 as seen in FIG. 7.

FIG. 8 shows the new pipe 1B as corrected in shape. A circumferential clearance 12 is formed between the outer and inner new pipes 1A and 1B due to the difference between these new pipes 1A, 1B in diameter.

As shown in FIG. 9, a lining material 13 such as cement milk is injected and filled into the clearance 12 between the new pipes 1A, 1B and cured for hardening, whereby the pipe 1A can be given increased strength against the external pressure.

To prevent the inner new pipe 1B from deforming during the injection of the lining material, a noncompressive fluid, such as water or the like, is filled into the new pipe 1B between plug members 14, 14 installed at opposite ends. The outer new pipe 1A then deforms along the inner surface irregularities of the sewage tube a under the pressure of the lining material filled in, but the inner new pipe 1B is given a neat straight finish as shown in FIG. 10.

The pressure required for restoring the metal tubular material 1 in a flattend and folded shape to the new pipe 1A (or 1B) differs with the kind of base substance, diameter, wall thickness, etc. For example, when measuring 150 mm (outside diameter)×0.8 mm (wall thickness) and made of stainless steel, the tubular material can be restored to a circular form in cross section by internally applying a pressure of about 15 to about 30 kg/cm$^2$ (gauge pressure) to the material.

With the repair method of the invention, the metal tubular material 1 wound up in a flattend and folded shape into a roll is paid off and inserted into the existing underground pipes, so that the method obviates the need to join tubular members to one another by welding as practiced by the conventional pipe-in-pipe method, consequently achieving a high repair work efficiency.

Moreover, the work pit needs only to provide such a space as to pass the metal tubular material 1 therethrough. In the case of the sewage pipe a, for example, the manhole b can be utilized as it is as the work pit.

When strength against an external pressure is required as is the case with sewage pipes, this requirement can be fulfilled by installing a double pipe, i.e. inner and outer new pipes, and providing a lining material in a circumferential clearance between the inner and outer new pipes.

FIGS. 11 to 22 show a preferred example of process for producing the metal tubular material 1 in a flattend and folded shape.

With this production process, the metal tubular material 1 is prepared from a metal strip, which is not specifically limited in base substance insofar as the strip can be worked by roll forming. However, a stainless steel strip is suitable in view of workability and the corrosion resistance required of the repair material.

It is required that the metal strip have a relatively small thickness so as to be workable, for example, by roll forming and by folding flat. In the case of stainless steel, the thickness is suitably determined from the range of about 0.5 to about 40 mm in view of the width of the metal strip to be used and accordingly the entire circumference of the metal tubular material 1 to be prepared from the strip by roll forming.

Figure 11:
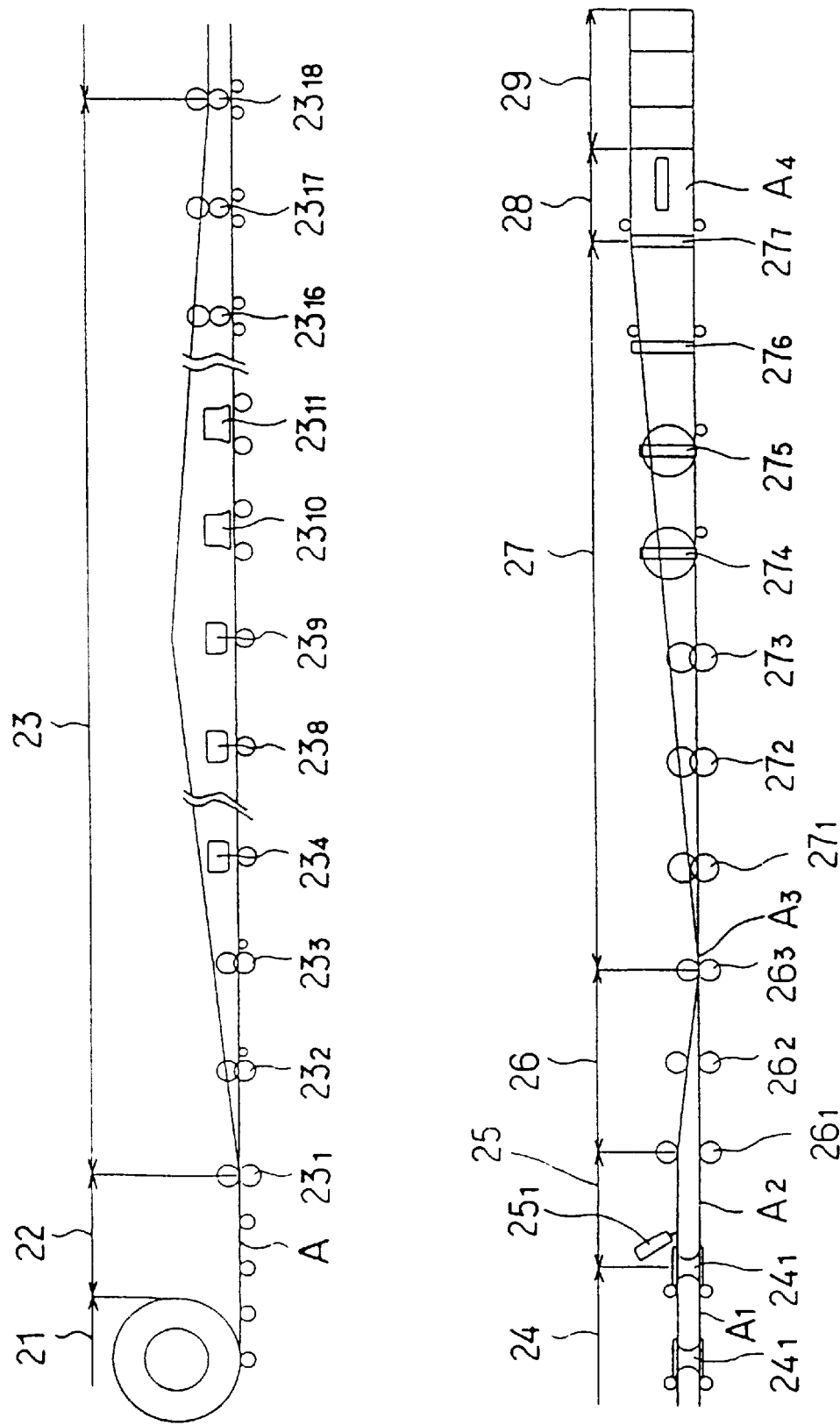
FIGS. 11 is a diagram schematically showing the entire production line for practicing the production process of the invention.

FIG. 11 schematically shows the overall production line for practicing the production process. A metal strip A is paid off from a coil 21 in an unwinding section 22, fed to a first step to a fifth step successively, worked as specified in each of these steps and made into a finished product. These steps will be described below in detail.

Figure 12:
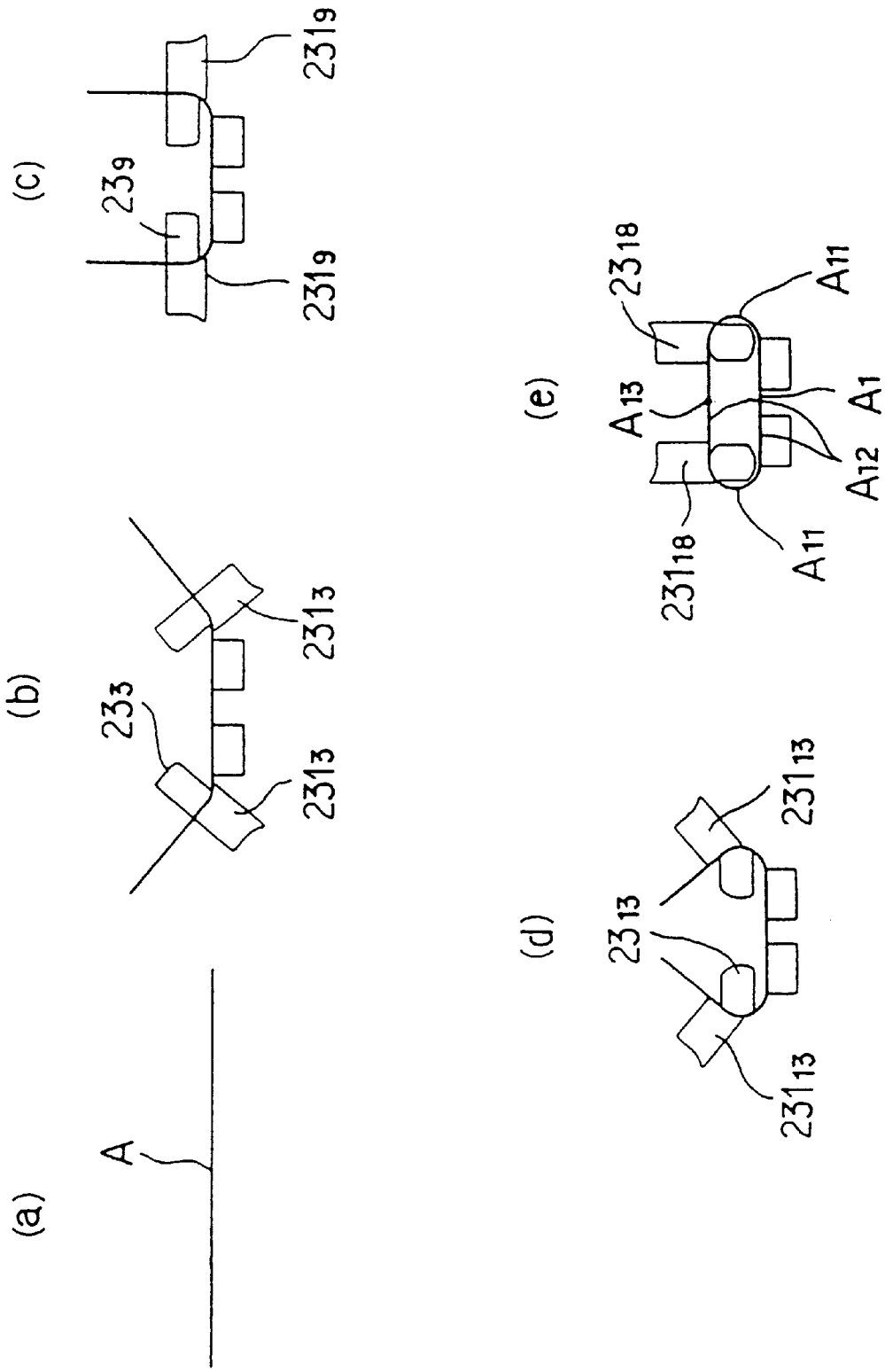
FIG. 12 is a diagram schematically showing a first step, i.e., a roll forming operation.

In the first step, the metal strip A is shaped into a metal tubular product A1 of elliptic cross section by roll forming means. As shown in FIG. 12 (e), the metal tubular product A1 comprises, in cross section, short sides In the form of rounded portions A11 each subtending an angle of about 180 deg, and long sides in the form of two parallel straight portions A12, A12, one of the straight portions A12 having a seam A13 at its midpoint or in the vicinity thereof.

The first step is performed in a roll forming section 23 which has a plurality of, e.g., eighteen, forming roll units $23_1$ to $23_{18}$ arranged side by side as seen in FIG. 11. The strip A is passed through these forming roll units $23_1$ to $23_{18}$ and thereby rounded progressively from portion to portion. For example, a rounded portion subtending an angle of 10 deg is formed by each unit to eventually form the strip to the specified elliptical shape in cross section.

FIGS. 12, (a) to (e) schematically show how the strip A is worked in the roll forming section 23. The Or strip A shown in FIG. 12 (a) is formed with rounded portions each subtending an angle of about 30 deg by being passed through the first roll unit to the third roll unit $23_3$ shown in FIG. 12 (b). Further passage through up to the 9th roll unit $23_9$shown in FIG. 12 (c) forms rounded portions each subtending an angle of about 90 deg. Further passage through up to the 13th roll unit $23_{13}$ shown in FIG. 12 (d) forms rounded portions each subtending an angle of about 130 deg. Further passage through up to the 18th (last) roll unit $23_{18}$ shown in FIG. 12 (e) forms rounded portions each subtending an angle of about 180 deg. In this way, the metal tubular product A1 of elliptical cross section is completely shaped.

As will be apparent from FIG. 12 (e), the metal tubular product A1 has a rounded portion A11 at each short side thereof and long sides which remain unworked in the form of two parallel straight portions A12.

When there arises a need to increase or decrease the circumference of the tubular product A1, consequently the outside diameter thereof, this can be accomplished by altering the length of the two parallel straight portions A12 at the long sides without varying the radius of curvature of the rounded portions A11 at the short sides.

The radius of curvature of the rounded portions A11 can be determined from a wide range, for example, from the range of about 30 to about 150 mm in the case where the outside diameter of the tubular product A1 is 100 to 800 mm calculated as a true circle.

The forming roll units $23_1$ to $23_{18}$ for roll forming each comprise a pair of opposed (right and left) roll assemblies $231_1, 231_1$ (to $231_{18}, 231_{18}$) as shown in FIGS. 12, (b) to (e).

The distance between the opposed assemblies is variable for adjustment, whereby the length of the straight portions A12 of the metal tubular product A1 can be altered. FIGS. 12, (b) to (e) show forming rolls for use in forming rounded portions subtending 30, 90, 130 and 180 deg, and other rolls are not shown.

The metal tubular product A1 of elliptical cross section obtained in the first step is continuously sent to a butting section 24 and then to a welding section 25 for performing the second step. The seam A13 [see FIG. 12 (e)] is continuously welded by a welding machine $25_1$ in this section 25.

Incidentally, the tubular product A1 is passed through the butting section 24 so that the product A1 can be firmly joined at its opposed edges without forming any clearance at the portion of the seam A13.

The butting section 24 has a plurality of, e.g., two, butting roll units $24_1$, $24_1$ arranged side by side. As shown in FIG. 13, each butting roll unit $24_1$ comprises a pair of opposed (right and left) press rolls $24_{11}$.

The method of welding is not limited particularly; MIG (metal inert gas) welding or TIG (tungsten inert gas) welding is especially excellent in weld strength and lower in equipment cost, while such welding means is usable in a limited space and therefore suitable for producing a wide variety of products in small quantities.

When MIG welding or TIG welding is resorted to, it is suitable to weld the seam A13 of the tubular product A1 on the front side thereof with its rear side held in an inert gas atmosphere.

The welding of the seam A13 affords a metal tube A2 of elliptical cross section. As shown in FIG. 11, the tube A2 is sent to a flattening section 26 for performing the third step. In this section, the tube A2 is successively passed through a plurality of, e.g., three, flatting roll units $26_1$ to $26_3$ arranged side by side and thereby flattened progressively.

The number of flattening roll units may be suitably determined, for example, in view of the width of flattening. As shown in FIGS. 14, (a) and (b), each flattening roll unit comprises a pair of upper and lower rolls. Passage through the last flattening roll unit 26n affords a flat metal tube A3 as schematically shown in FIG. 14 (b).

With reference to FIG. 11, the flat metal tube A3 is continuously sent to a section 27 for folding the tube in two, i.e., for performing the fourth step. The tube is folded in this section.

The folding section 27 has a plurality of, e.g., seven, folding roll units $27_1$ to $27_7$ arranged side by side. The flat metal tube A3 can be progressively folded when passed through these roll units $27_1$ to $27_7$.

Figure 15:
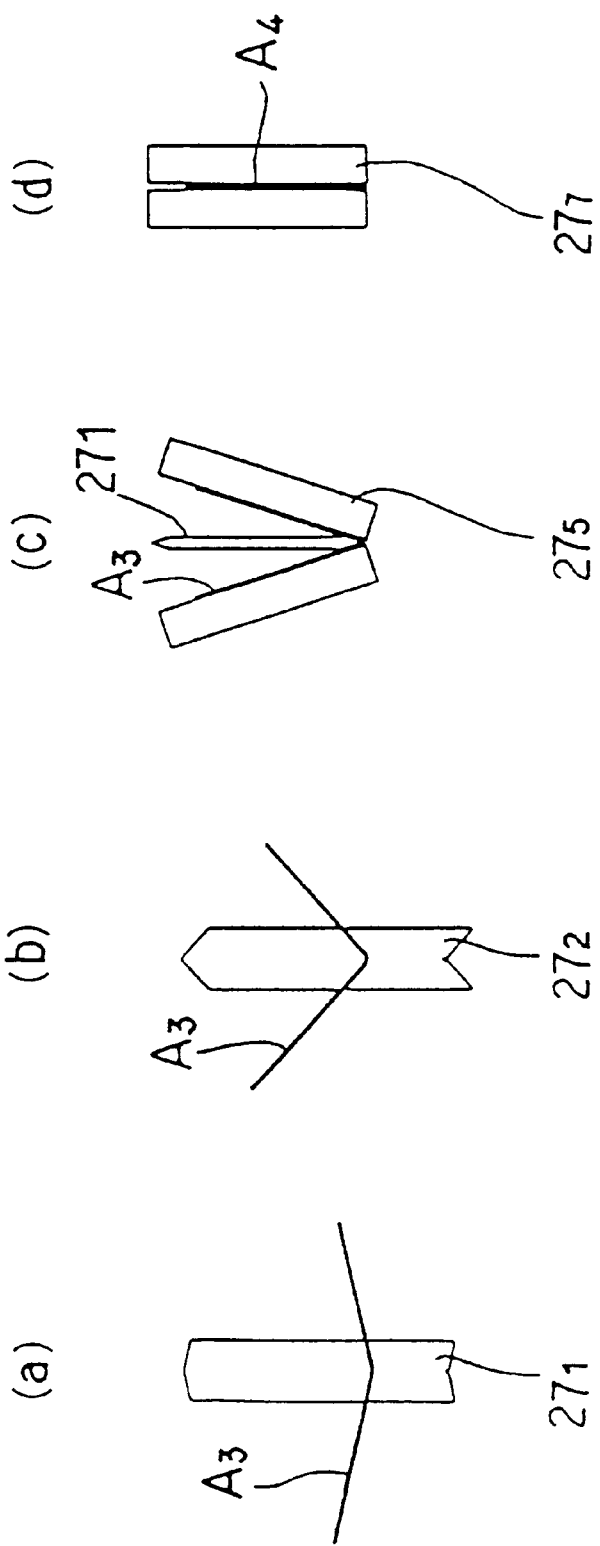
FIG. 15 is a diagram schematically showing a fourth step, i.e., a folding operation.

Of these folding roll units, the upstream three roll units $27_1$ to $27_3$ each comprise a pair of upper and lower rolls as shown in FIGS. 15, (a) and (b). When passed through the upstream folding roll units $27_1$ to $27_3$, the tube is folded from 0 through 60 deg at one side, i.e., from 0 through 120 deg in its entirety. The downstream four folding roll units $27_4$ to $27_7$ each comprise a pair of left and right rolls as seen in FIGS. 15, (c) and (d). When passed through the downstream folding roll units $27_4$ to $27_7$, the tube is folded through 90 deg at one side, i.e., through 180 deg in its entirety. Incidentally, FIGS. 15, (a) to (d) show first, second, fifth and seventh folding roll units $27_1$, $27_2$, $27_5$ and 277. and the other folding roll units are not shown.

Of the downstream four roll units, the three roll units $27_4$ to $27_6$ other than the last are each provided with an auxiliary roll, i.e., a holding roll 271, shown in FIG. 15 (c) so as not to permit the metal tube A3 to move upward along the pair of rolls owing to repulsive resiliency during folding. The seven roll units are thus used for folding in the fourth step, whereas fifteen roll units may be arranged side by side so as to fold the tube through 6 deg by each roll unit.

The fourth step affords a metal tube A4 in a flattend and folded shape. As seen in FIG. 11, the folded metal tube A4 is sent to a winding section 29 for performing the fifth step and continuously wound into a roll while being pulled by a hauling roll device 28 which is positively driven.

Figure 16:
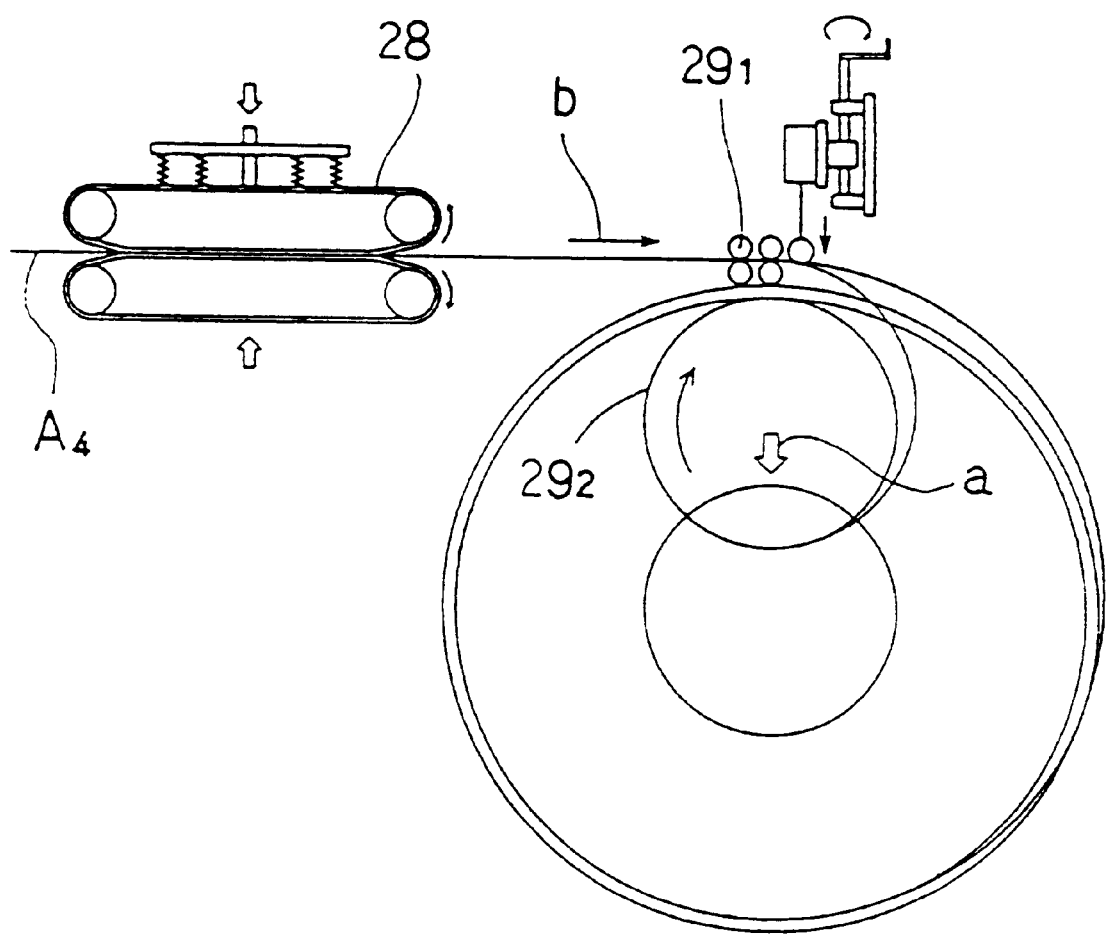
FIG. 16 is a diagram schematically showing a fifth step, i.e., a winding operation.

With reference to FIG. 16, a bending roll device $29_1$ is installed in the winding section 29. The folded metal tube A4 is wound up around a roll $29_2$ while being bent in the winding direction when passed through the roll device $29_1$.

Since the diameter of the winding on the roll $29_2$ progressively increases as the metal tube A4 is wound up, the roll $29_2$ is movable in a direction indicated by the arrow a in FIG. 16 and orthogonal to the direction b of delivery of the tube A4 as the winding diameter increases.

Figure 17:
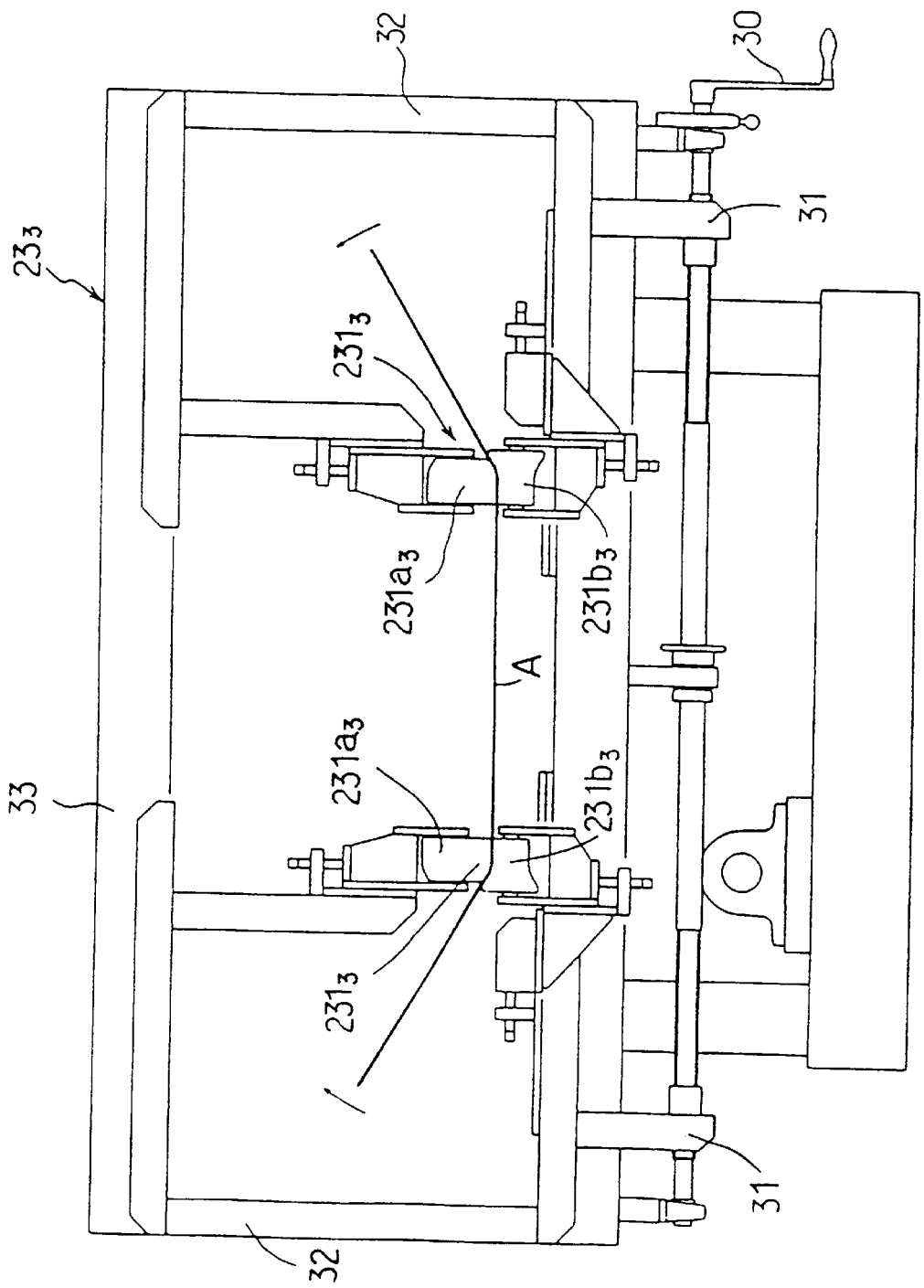
FIG. 17 is a front view schematically showing an example of roll unit included in forming roll units for use in roll forming and adapted to form rounded portions each subtending an angle of 30 deg.

Of the forming roll units for use in roll forming, the roll unit $23_3$ for forming rounded portions each subtending an angle of 30 deg is shown in detail in FIG. 17.

The forming roll unit $23_3$ comprises a pair of left and right roll assemblies $231_3$, $231_3$ each comprising a pair of opposed rolls $231a_3$, $231b_3$, with the metal strip A nipped therebetween.

The pair of roll assemblies $231_3$, $231_3$ are supported by respective movable frames 32, 32 which are movable toward or away from each other by a handle 30 through screw feed mechanisms 31 of the turnbuckle type, with a fixed frame 33 serving as a guide. The roll assemblies $231_3$, $231_3$ are moved toward or away from each other by moving the handle 30, whereby the distance between the assemblies can be adjusted steplessly as desired.

Figure 18:
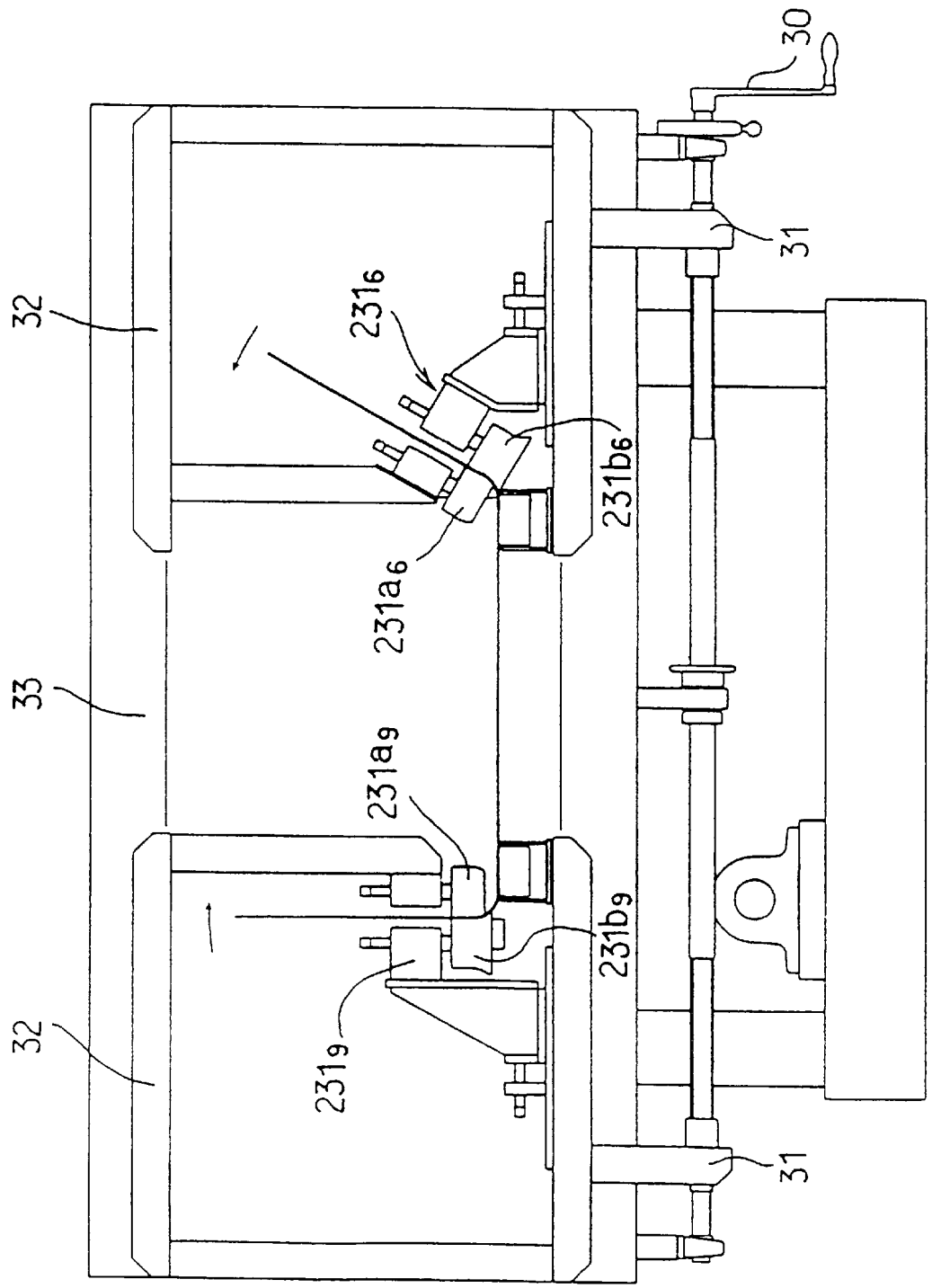
FIG. 18 is a front view schematically showing examples of roll units for forming rounded portions subtending an angle of 60 deg (at right) and an angle of 90 deg (at left)

FIG. 18 shows the roll assemblies $231_6$, $231_9$ for use in forming rounded portions subtending respective angles of 60 deg and 90 deg, dividedly at right and at left, respectively. These assemblies are originally separate but shown in one drawing for the sake of convenience. The distance between the roll assemblies is adjustable by moving a handle 30 in FIG. 18 as in FIG. 17.

Figure 19:
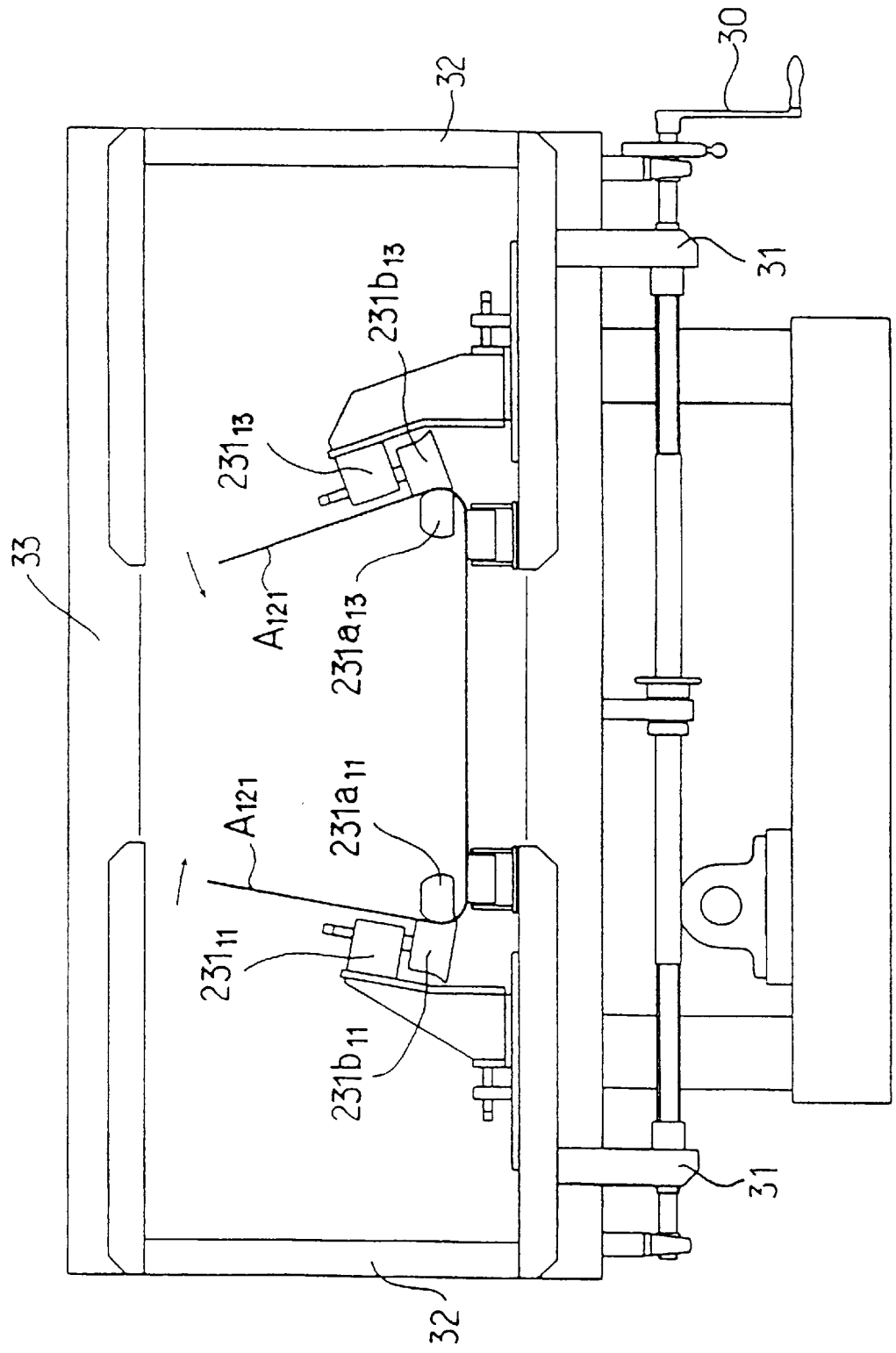
FIG. 19 is a front view schematically showing examples of roll units for forming rounded portions subtending an angle of 110 deg (at left) and an angle of 130 deg (at right)
Figure 20:
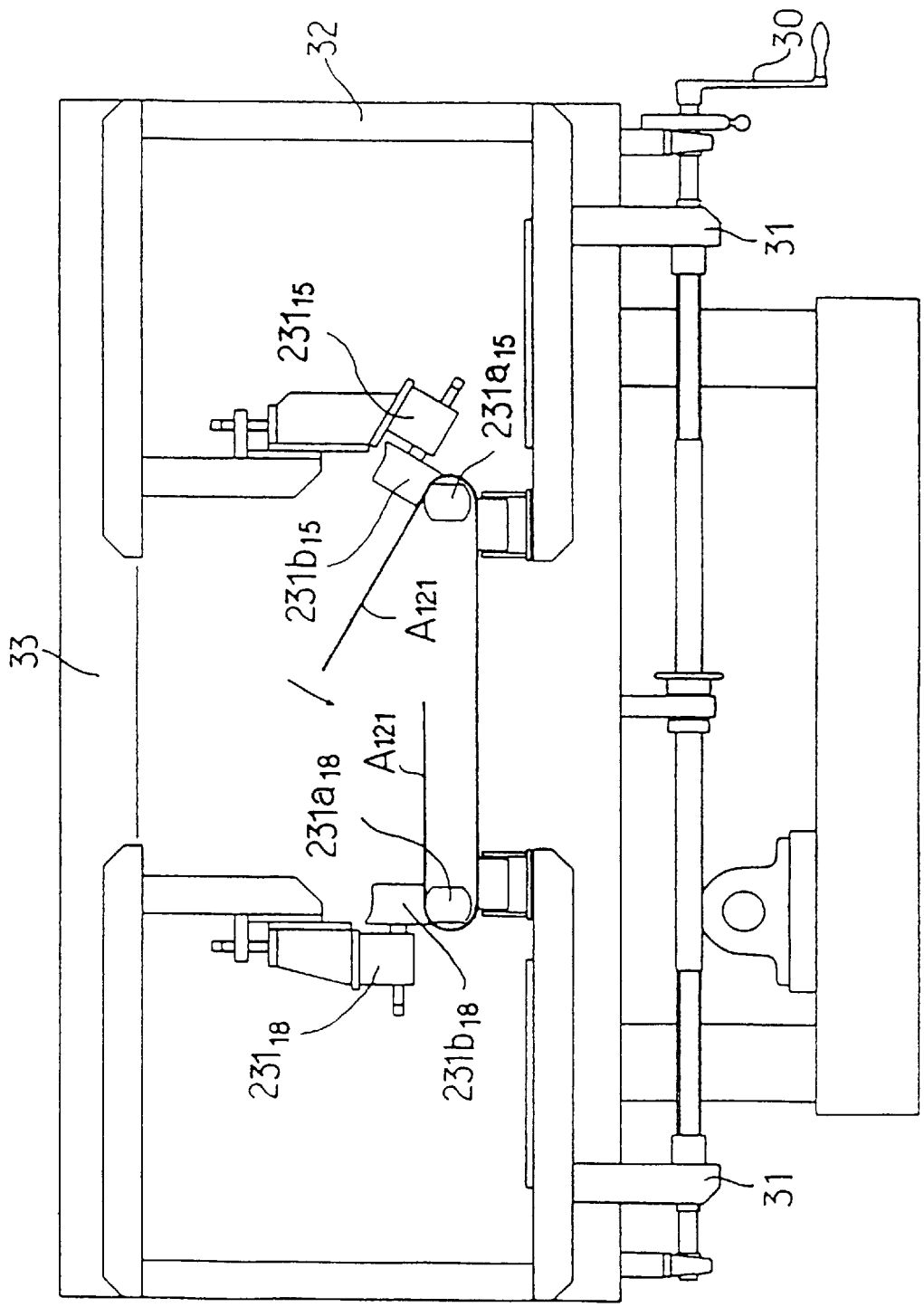
FIG. 20 is a front view schematically showing examples of roll units for forming rounded portions subtending an angle of 150 deg (at right) and an angle of 180 deg (at left)

The roll assemblies $231_{11}$, $231_{13}$ for use in forming rounded portions subtending respective angles of 110 deg and 130 deg are shown in FIG. 19 dividedly at left and right, respectively. The roll assemblies $231_{15}$, $231_{18}$ for use in forming rounded portions subtending respective angles of 150 deg and 180 deg are shown in FIG. 20 dividedly at right and at left, respectively. In each of FIGS. 19 and 20 as in FIG. 18, the roll assemblies shown are originally separate but illustrated in one drawing for the sake of convenience.

The roll assemblies shown in FIGS. 19 and 20 are used for forming rounded portions subtending angles greater than 90 deg, so that of the pair of rolls constituting each of these roll assemblies, the outer roll $231b_{11}$ ($231b_{13}$, $231b_{15}$, $231b_{18}$) disposed outside the portion to be rounded is supported by the movable frame 32 and movable toward or away from the other like roll by the handle 30 for the adjustment of the distance therebetween as in FIGS. 17 and 18. However, the inner roll $231a_{11}$ ($231a_{13}$, $231a_{15}$, $231a_{18}$) disposed inside the portion rounded can not be supported by the movable frame 32 because half of the upper straight portion $A_{121}$ bent through an angle greater than 90 deg (see FIG. 19 or 20) becomes an obstacle.

Figure 21:
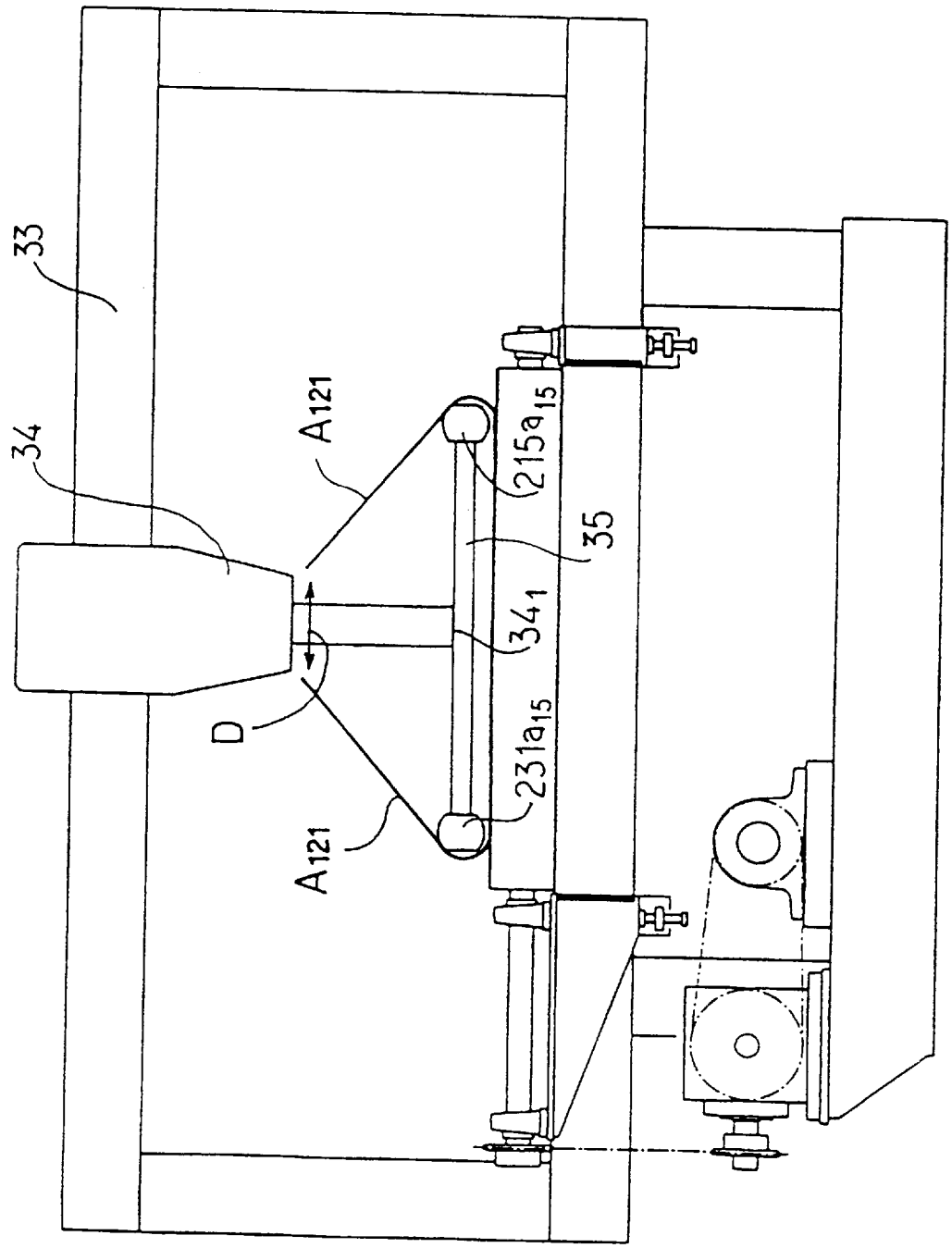
FIG. 21 is a front view schematically showing an example of means for supporting inner rolls which are included in the roll unit for use in rounding portions subtending an angle greater than 90 deg and which are positioned inside the rounded portions.

The pair of left and right inner rolls are mounted on a support 35 at the lower end $34_1$ of a support member 34 extending downward from the fixed frame 33 as shown in FIG. 21. The pair of left and right inner rolls may be supported, for example, by means of turnbuckle mechanisms like those shown in FIG. 17 to make the distance between these rolls adjustable. Alternatively, a plurality of pairs of such rolls which are different in the distance may be prepared to use one of them selectively.

Omitted from FIG. 21 are the outer rolls arranged outside the respective portions to be rounded, and the means for moving these rolls toward or away from each other.

For the inner rolls for use in forming rounded portions subtending angles, for example, of 110 deg to about 140 deg, the lower end $34_1$ of each support member 34 can be inserted inside the opposed half straight portions $A_{121}$, $A_{121}$, through the space D therebetween (see FIG. 21), so that the inner rolls of each forming roll unit can be mounted on the support member 34. In the case of the four forming roll units for 150 deg to 180 deg, however, the space D is diminished by the progress of working, making it difficult to insert the support member through the space D. As schematically shown in FIG. 22, the supports 35 of these units are therefore connected by rods 36, for example, to the support 35 which is supported by the lower end $34_1$ of the support member 34 of the forming roll unit for 140 deg, such that the supports 35 of these units are made to support the inner rollers (not shown). In this arrangement, an inert gas supply source 38 is connected by a rod 37 to the last support 35, whereby an inert gas atmosphere can be formed inside the seam A13 (see FIG. 13) with use of the supply source 38.

According to the production process described, a metal strip is first made into a tubular product of an elliptical cross section comprising short sides in the form of rounded portions and long sides in the form of two parallel straight portions, and is thereafter folded flat. The entire circumference of the tubular product can therefore be altered merely by varying the length of the two straight portions without varying the curvature of the rounded portions in any way. Thus, the process is suited to the preparation of a wide variety of products in small quantities.

Further since the process is adapted to flatten a tube of elliptical cross section including two parallel long sides, the tube can be flatten easily with a high efficiency.

What we claim is:

1. In renovating an existing underground pipe with a new metal pipe installed inside the underground pipe, a method of repairing the existing underground pipe characterized by transporting a metal tubular material as wound up in the form of a roll to a repair site, the tubular material being folded flat by plastic deformation so as to be diminished in effective outside diameter and being capable of forming a new metal pipe of an outside diameter corresponding to the inside diameter of the underground pipe when inflated by application of pressure from inside, installing the roll of tubular material on the ground, subsequently unwinding the tubular material from the roll, inserting the tubular material into the underground pipe through an underground work pit while passing the tubular material between curl removing correction rolls immediately after unwinding for correction to a straight form, closing opposite ends of the inserted portion of the tubular material, and thereafter inflating the closed portion of the tubular material, by applying pressure thereto from inside with a pressure fluid to form a new metal pipe of circular cross section from the tubular material.

2. A repairing method according to claim 1 which is characterized by installing another new pipe inside the new pipe formed within the existing underground pipe, with a circumferential clearance provided between the two new pipes, the existing underground pipe being a sewage pipe, and injecting and filling a lining material into the circumferential clearance between the new pipes.

3. A process for continuously producing a metal tubular material as folded flat for use in a repairing method according to claim 1, the process being characterized by continuously subjecting a metal strip to a first step to a fifth step in succession while unwinding the metal strip from a coil, the first step comprising passing the metal strip continuously unwound from the coil through a plurality of forming roll units arranged side by side to progressively form the metal strip into a metal tubular product of elliptical cross section, the metal tubular product comprising in cross section opposed short sides each in the form of a rounded portion subtending an angle of about 180 deg and opposed long sides in the form of two parallel straight portions, the metal tubular product having a seam at the midpoint of one of the straight portions or in the vicinity thereof, the second step comprising welding the seam of the metal tubular product continuously sent out from the first step to prepare a metal tube of elliptical cross section, the third step comprising passing the metal tube continuously sent out from the second step through a plurality of flattening roll units arranged side by side to progressively flatten the metal tube, the fourth step comprising passing the resulting flat metal tube continuously sen to out from the third step through a plurality of folding roll units arranged side by side to progressively fold the flat metal tube to obtain a metal tubular material in a flattend and folded shape, the fifth step comprising winding up the tubular material in a flattend and folded shape and continuously sent out from the fourth step into a roll.

4. A continuous production process according to claim 3 which is characterized in that the metal strip is made of stainless steel and has a thickness of 0.5 to 4.0 mm, and the metal tube of elliptical cross section has an outside diameter of 100 to 800 mm calculated as a true circle, and short sides each in the form of a rounded portion having a radius of curvature of 30 to 150 mm.

5. A continuous production process according to claim 3 which is characterized in that the plurality of forming roll units arranged side by side for effecting roll forming in the first step each comprise a pair of laterally opposed forming roll assemblies with an adjustable distance provided therebetween, the distance between the pair of opposed forming roll assemblies being adjustable to alter the entire circumference of the metal tube of elliptical cross section.

6. A continuous production process according to claim 3 which is characterized in that the seam is welded in the second step on the outer surface of the tubular product by MIG welding or TIG welding, with an inert gas atmosphere formed inside the seam.

7. A continuous production process according to claim 3 which is characterized in that when to be wound up into a roll in the fifth step, the metal tubular material in a flattend and folded shape is sent out toward a takeup roll while being bent toward the direction of winding, the takeup roll being movable in a direction a orthogonal to the direction b of delivery from the fourth step as the diameter of winding increases.

\* \* \* \* \*